United States Patent
Willey

[11] Patent Number: 5,845,955
[45] Date of Patent: Dec. 8, 1998

[54] MOTORCYCLE WINDSHIELD MOUNTING SYSTEM

[76] Inventor: Barry A. Willey, 727 Ela Rd., Inverness, Ill. 60067

[21] Appl. No.: 680,007

[22] Filed: Jul. 15, 1996

[51] Int. Cl.[6] .................. B62J 17/00; B60J 1/00
[52] U.S. Cl. ........................... 296/78.1; 296/84.1
[58] Field of Search ................. 296/78.1, 84.1, 296/90, 96.12, 96.21, 201

[56] References Cited

U.S. PATENT DOCUMENTS

| | | | |
|---|---|---|---|
| 2,589,993 | 3/1952 | Comiskey, Sr. | 296/78.1 |
| 2,675,266 | 4/1954 | Comiskey, Sr. | 296/78.1 |
| 2,903,297 | 9/1959 | Zbikowski | 296/78.1 |
| 3,561,815 | 2/1971 | Stone | 296/78.1 |
| 3,866,242 | 2/1975 | Slagel | 296/78.1 X |
| 4,010,976 | 3/1977 | Shields | 296/78.1 |
| 4,489,973 | 12/1984 | Willey | 296/78.1 |
| 5,658,035 | 8/1997 | Armstrong | 296/78.1 |

FOREIGN PATENT DOCUMENTS 979320  4/1951  France .................. 296/78.1

Primary Examiner—Joseph D. Pape
Attorney, Agent, or Firm—James T. Fitzgibbon

[57] ABSTRACT

A motorcycle windshield and mounting system. The shield includes upper and lower portions, and the attachment includes a pair of lower, rearwardly extending brackets connected to each other by a transverse element. The front of the windshield is covered by two vertically extending clamping elements and one horizontally extending element. The transverse front element includes a pair of slots, and the vertically extending elements include a tongue for the slots and an arcuate relief, whereby the vertical elements partially overlie the transverse elements.

4 Claims, 2 Drawing Sheets

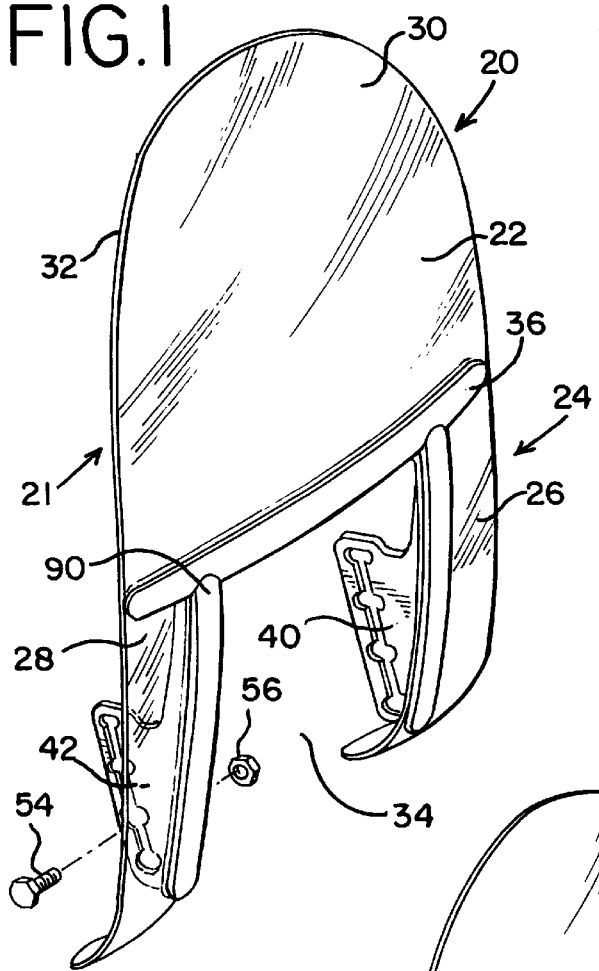
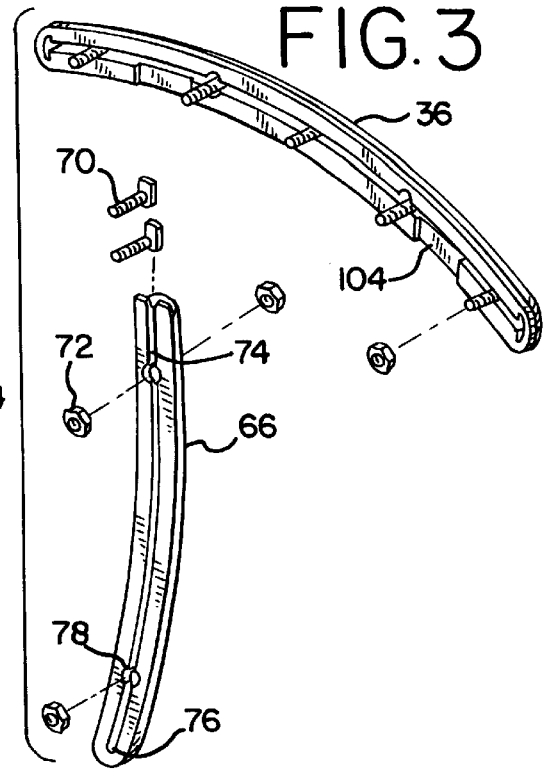
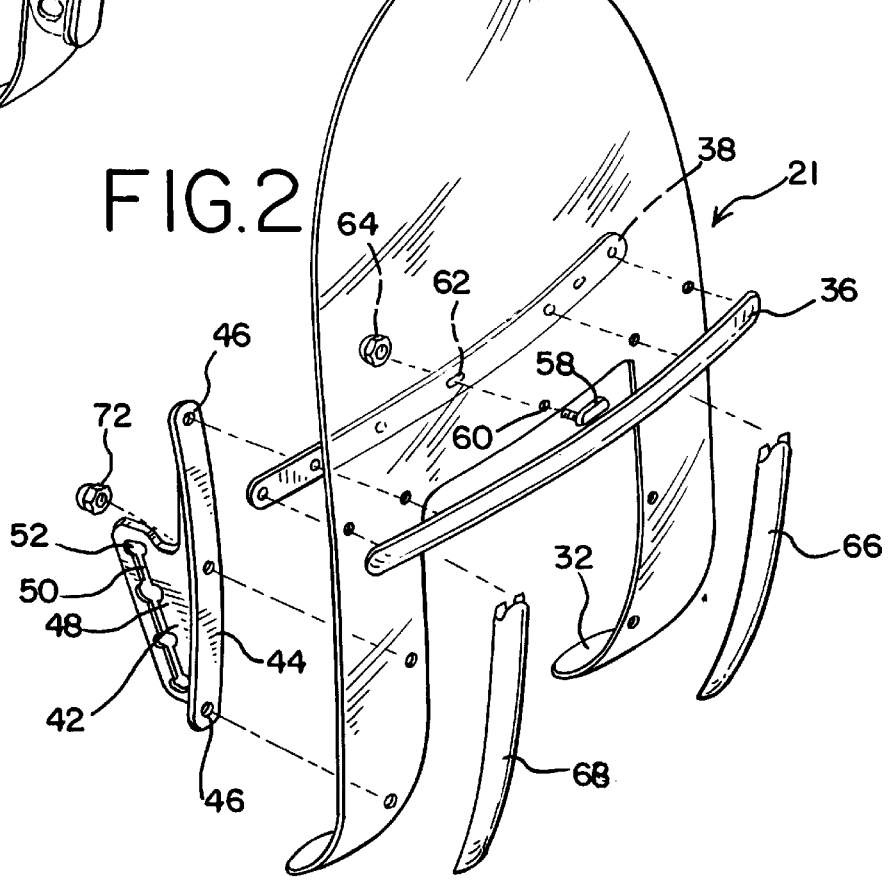

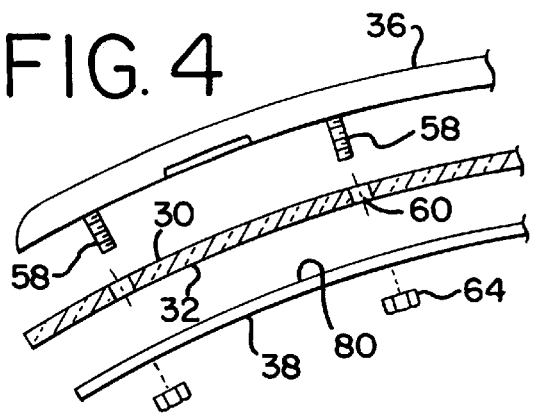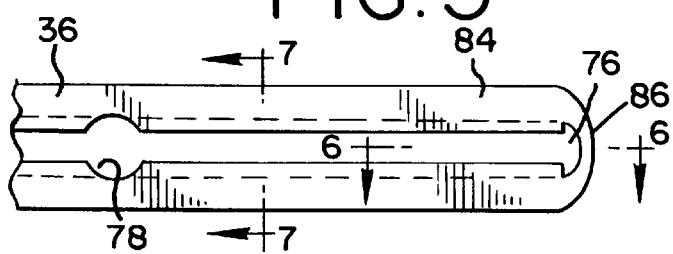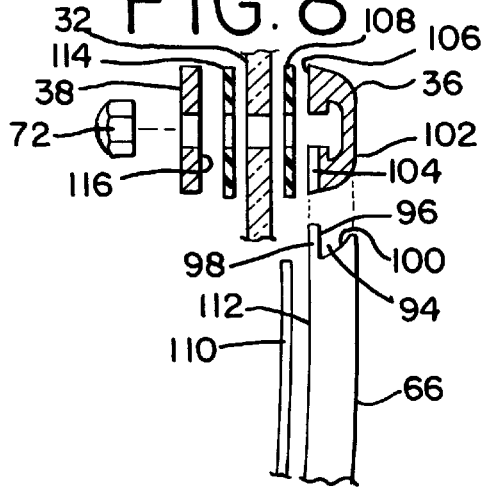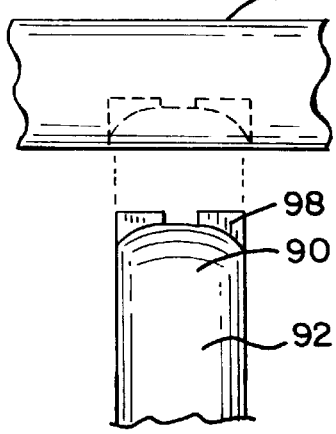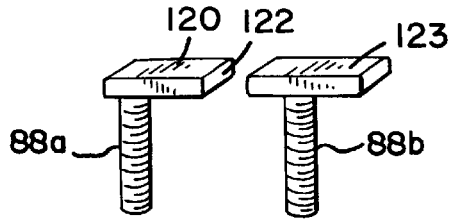

MOTORCYCLE WINDSHIELD MOUNTING SYSTEM

BACKGROUND OF THE INVENTION

The present invention relates generally to motorcycle accessories, and more particularly, to a motorcycle windshield having a novel structural support system.

While a windshield is not strictly necessary to the operation of a motorcycle, more and more motorcycles are either coming equipped with windshields or are having windshields secured to them as an aftermarket accessory. In fact, the motorcycle windshield or fairing is probably the most commonly purchased, relatively expensive accessory in the motorcycle industry.

A significant number of the motorcycles that use ordinary, rather simply contoured windshields are mounted by a relatively simple system and that positions a one or two piece shield in front of the rider so as to afford a principal panel or see-through portion, one or more lower panels that also serve as wind deflectors but extend downwardly toward the front fender and beneath the rider's line of sight.

The ordinary motorcycle windshield of this type has curves in at least one and usually two planes, and is supported by a structure which cantilevers the see-through or principal portion of the shield above a certain level. In such shields, in contrast to those wherein mounting legs are affixed to an upper portion of the shield, the mounting brackets and other shield positioners must be relatively strong in view of the fact that a large portion of the shield extends upwardly in a cantilevered or unsupported relationship above the midline of the shield. In many cases, 50–70% of the height of the shield lies above a principal transverse or cross brace which in turn intersects a pair of generally vertically extending braces lying therebeneath.

Normally, mounting brackets are affixed to the cycle of this lower end, and this upper end supports a transverse bar or brace to which the shield is secured. In some cases, fasteners extend through the windshield into a rear brace, and in other cases, the shield in effect is pinched between opposed inner and outer support surfaces.

In the motorcycle industry, in addition to the trend towards securely affixing windshields to motorcycles, there is a very widespread trend towards imparting an improved, finished appearance to such a windshield. At present, many stock or standard type windshields include exterior portions that, because of their strength requirement, are relatively unsightly to the eye. In other cases, the bracing or mounting system lacks a desired degree of rigidity. Considering that, in use, shield is exposed to bending forces imposed by relative winds of up to 100 mph or more, these forces are quite high. Additionally, the shields are also subjected to vibration of various frequencies. In combination, these forces can be relatively destructive to the shield, and, as is well known, any failure of the shield can have serious consequences from the standpoint of safety and controllability of the motorcycle.

Were the windshield to be suddenly released from its mounting, the operator's control might be imperiled with serious consequences. Moreover, an improper mounting system holds out the risk of cracking the windshield, which can occur if high, localized stresses are applied to the windshield, especially at a point wherein bending forces occasioned by the wind are concentrated near unsupported openings or sharp corners.

In view of these circumstances, there has been a need for an improved mounting system for motorcycle windshields.

There has also been a need for mounting system which will impart strength and reliability to a motorcycle windshield mounting system, but will do so without compromising, and preferably improving, the appearance of the motorcycle.

In view of the failure of the prior art to provide windshield assemblies and windshield mounting systems that are advantageous in the various respects just described, it is an object of the present invention to provide an improved windshield and windshield mounting system.

Another object of the invention is to provide a shield mounting system which includes rugged exterior support components that are visually pleasing and create a finished, "custom" appearance.

Yet another object of the invention is to provide a replacement kit wherein portions of an existing mounting system may be discarded and improved components may be substituted with the result of providing a more secure, highly decorative shield mounting system.

Still another object of the invention is to provide a mounting system for structural and decorative components wherein the fasteners are adjustably but securely positioned for cooperation with other portions of a clamping system that secures the shield between opposed, facing clamping elements.

A still further object of the invention is to provide a sandwich type mounting system for a motorcycle windshield that is adaptable for use as an addition to or replacement for existing shield mounting systems, but which provides increased strength, protection against damaging vibration, and ease of installation and alignment.

Another object of the invention is to provide a shield mounting system wherein the shield is positioned between front and rear clamping elements, the front element of which includes an elongated T-slot running parallel to its long axis and which, in one embodiment, prevents removal of captive fasteners from either of its end and includes at least one spaced apart fastener insertion opening therein, and, in another embodiment, comprises a similar, elongated T-slot which is open at one end and closed at the other.

Yet another object of the invention is to provide a rugged, sturdy clamping element having at least a pair of vertical components and a transverse or horizontal element, with a tongue and groove and recess arrangement being provided on mating portions of the parts so as to achieve a snug fit between parts and creates an overall high quality appearance.

Still another object of the invention is to provide a motorcycle windshield mounting system wherein the front portions of the clamping elements are made from extrusions containing a T-slot formation and which elements are thereafter formed by swaging to close and finish the end portions and which elements may be thereafter decoratively plated and polished.

A further object of the invention is to provide a mounting system wherein the clamping elements further include gaskets to minimize stress concentrations within the shield.

The foregoing and other objects and advantages of the invention are achieved in practice by providing a windshield mounting assembly which includes front and rear sets of clamping elements, the front elements having finished and contoured leading surfaces and further including transverse and vertical elements each having T-slots to receive fasteners therein and cooperating with said shield and a pair of mounting brackets having shield engaging clamping surfaces thereon as well as flanges or other portions adapted to receive fasteners for mounting to an associated motorcycle.

The manner in which the foregoing and other objects and advantages of the invention are achieved in practice will become more clearly apparent when reference is made to the following detailed description of the preferred embodiments of the invention set forth by way of example and shown in the accompanying drawings wherein like reference numbers or legends indicate corresponding parts throughout.

BRIEF DESCRIPTION OF THE DRAWINGS

FIG. 1 is a perspective view of a motorcycle windshield made according to the invention;

FIG. 2 is an exploded perspective view of the windshield of FIG. 1, showing the various components of the combination mounting and clamping assembly in spaced apart relation to one another and to the associated windshield;

FIG. 3 is an enlarged perspective view showing the front transverse clamping element, the manner of positioning fasteners therein and showing, in exploded relation, the vertically extending front clamping element;

FIG. 4 is a bottom plan view, with portions broken away, showing the windshield, and the front and rear transverse clamping elements relative to the shield;

FIG. 5 is a fragmentary rear elevational view of the front transverse clamping element of the invention, showing the end portion of the T-slot and a fastener insertion opening forming a part of the clamping element;

FIG. 6 is a fragmentary sectional view of a portion of the clamping unit of FIG. 5, taken along lines 6—6 of FIG. 5;

FIG. 7 is a vertical sectional view, taken along lines 7—7 of FIG. 5 and showing the T-slot for receiving the fasteners and forming a part of the clamping system;

FIG. 8 is an exploded fragmentary side view, partly in elevation and partly in section, and showing the manner in which the vertical and transversed front clamping elements abut each other in their assembled relation, and further showing representative forms of gaskets that are useful with the clamping elements of the invention;

FIG. 9 is a front elevational view of the clamping elements of FIG. 8, also showing the same in exploded relation; and FIG. 10 is an elevational views of different forms of fasteners suitable for use with the invention.

DESCRIPTION OF THE PREFERRED EMBODIMENTS OF THE INVENTION

While the present invention is capable of a number of uses and may be the subject of various changes and modifications, a description will be given of preferred forms of apparatus, one of which comprises a motorcycle windshield mounting assembly and the other a kit for replacing selected components of existing motorcycle windshield mounting assemblies with improved components embodying the present invention.

Referring now to the drawings in greater detail, there is shown in FIGS. 1 and 2 a windshield assembly generally designated 20 and shown to include a windshield 21 per se having an upper portion 22 and a lower portion generally designated 24 and shown to include left- and right-hand transparent lower panels 26, 28. When the expression "left" or the like is used, the direction is intended to mean relative to the hand of a rider astride the motorcycle. Likewise, while the windshield mounting assembly of the invention may be positioned in various orientations, expressions such as "forward" or the like and "upper" and "lower" are intended to mean portions of the assembly having that orientation in normal use.

The windshield unit generally designated 21, will be seen to have front and rear surfaces respectively designated 30, 32. According to the usual practice, the left- and right-hand lower panels 26, 28 define therebetween a generally open area 34, such as for receiving the mounting clamp headlight. The windshield is functionally divided between the upper portion 22 and the lower portion 24 by a transverse, generally horizontally extending front clamping element 36 which is fastened through the shield 21 to a counterpart, transversely extending rear clamping element 38. The shield element 21 is sandwiched between these clamping elements 36, 38 in use.

In addition, as shown in FIGS. 1 and 2, each of the lower side panels 26, 28 has associated therewith a mounting bracket 40, 42. The brackets 42, being identical, only one is shown in FIG. 2 and only one requires a detailed description. As shown in the drawings, each of the brackets 42 includes a forwardly directed generally flat but arcuate face portion 44 having plural, fastener-receiving openings 46 therein. The bracket also includes a rearwardly extending flange portion 48 having a slot 50 with plural enlarged openings 52 therein. It is understood that these slots and openings 50, 52 provide space for receiving a fastening system such as the bolts 54 and the nuts 56 shown in FIG. 1. These flanges or ears mount to a portion of a motorcycle in a customary way that is known to those skilled in the art.

Further, in accordance with the invention, the front transverse clamping element 36 receives a plurality of L-headed fasteners 58, the shank portions of which extend through openings 60 in the shield and counterpart openings 62 in the rear clamping element. The bolts or other fasteners 58 mate with locking nuts 64 which are positioned on the rear surface of the rear clamping brace. As will appear, the surfaces of these elements that face the windshield may include, as a portion thereof, a gasket made from a pliable material to which reference will be made herein.

Referring again to FIGS. 1 and 2, it will be noted that there are also left- and right-hand vertically extending clamping elements 66, 64, the structural details of which are referred to elsewhere herein. Each of these front clamping elements also includes a fastener 70 (shown exploded in FIG. 3) which cooperates with a locking nut 72. It will be understood that, for clarity of illustration, less than all of the fasteners are illustrated in FIGS. 1 and 2.

Referring now to FIG. 3, there is shown a rear perspective view of the front transverse clamping element 36 and the left-hand vertical front clamping element 66. Here, the fasteners 70 and the nuts 72 may be clearly seen as illustrated in an exploded relation. Referring again to FIG. 3, it is shown that an elongated, T-shaped, rearwardly opening slot 74 extends down a substantial length of the vertical clamping element 66, terminating in a closed end portion 76. It is also shown that enlarged, fastener insertion opening 78 are provided at spaced apart places along the length of the elongated T-slot 74.

Referring now to FIG. 4, a bottom plan view of the windshield and positioning apparatus of the invention, there is shown the curvilinear but generally parallel relation between the transverse front clamping element 36, the front and rear surfaces 30, 32 of the windshield with fastener openings 60 therein, and the rear clamping element 38. FIG. 4 also shows certain of the fasteners 58 and their lock nuts 64. In FIG. 4, it is shown that the front face 80 of the rear clamping element 38 and the rear face 82 of the front clamping element 36 are generally flat in one plane and bear the same curvature when viewed from the top or bottom as the windshield.

FIGS. 5–7 illustrate in detail the general configuration of the portions at and near the outer ends 84 of the front clamping element 36. Thus, FIG. 5 shows that, in front or rear elevation, the end portion 84 of the front includes a rounded portion 86, a reduced width slot end 76 referred to in connection with FIG. 3 and the fastener insertion opening 78. FIG. 7, taken along lines 7—7 of FIG. 5, shows generally the cross section of the T-slot in which headed fasteners such as the fasteners 88a, 88b in FIG. 10 may be positioned. FIG. 7 also shows that the contoured leading surface 77 of the clamping element 36 is preferably polished and plated to provide a deep-textured high quality appearance.

Referring now to FIGS. 3, 8 and 9, a feature of the invention discussed above was the desirability of having a nesting or overlap relation between the various front clamping elements with one another. In order to impart a smooth, finished look, a rounded end 90 is provided at the upper portion 92 of the vertical clamping element 66. A recess 94 is defined between the upper surface 96 of a tongue 98 on the element 66 and the inner, curvilinear mating surface 100, which in the assembled position of the components overlies an arcuate surface 102 on the transverse clamping element 36.

As shown in FIG. 8, the elongated tongue 98 fits within a vertical slot 104 in the rear surface 106 of the clamping element 36. When the parts are assembled, there is a smooth curvilinear overlap of the end portion 90 relative to the adjacent portions of the transverse element 36. Referring to FIG. 9, it will be noted that the tongue 98 is elongated in relation to the recess 94. FIG. 8 also shows that preferably, the clamping element 36 includes a gasket 108 made from a pliable material; a counterpart gasket 110 is provided for mating with the rear surface 112 of the vertical clamping element 66 and another gasket 114 is positioned so as to lie between the rear surface 32 of the windshield and the forward facing surface 116 of the rear clamping element 38.

FIG. 8 also shows that various openings and slots are provided so that the fastener, which is not shown in this view for clarity, may be positioned appropriately to secure these various layers of the assembly together. FIG. 8 shows that a flange nut 72 is the preferred form of nut to cooperate with the bolt of the type shown at 88a or 88b in FIG. 10.

Referring to FIGS. 6 and 7, it will be noted that, in the center or main portion of the front clamping element 36, the T-slot is of full height and width and would enable the head portion 120 of a fastener to slide back and forth therein. The head portion 120 of the fastener 88a shown in FIG. 10 includes an elongated tail 122 whereas the fastener 88b is shown as having a T-head 123. In either case, it will be understood that the head arrangement permits the bolts to slide for purposes of adjustment within the T-slot 74 but that the curvilinear end portion 124 at the end of the transverse bar 36 renders the fasteners captive inasmuch as the fastener head cannot follow the curve and tends to become locked in the slot 74 as the fastener approaches the end of the slot.

Accordingly, as shown in FIG. 3, fastener entry openings 78 are provided which permit insertion and intentional removal of the fasteners from but which prevent the fasteners inadvertently slipping out the end portions of the T-slot.

According to the preferred form of invention, the front clamping elements 36, 66, 68 are made from aluminum extrusions in bar form. Thereafter, the end portions are swaged into a rounded, tapered form as regards the outer ends of the transverse element and the lower ends of the vertical clamping elements. The upper ends of the vertical elements are milled to the shape shown in FIG. 8. The swaging action creates the curve shown in FIG. 6 within the T-slot 74, thus providing the effectively closed end portion referred to.

Thereafter, the extruded pieces are polished and given a decorative plating or embossing. Preferably, a rugged chrome plated finish is imparted over an extruded aluminum section to achieve this appearance. In addition, an engraved or debossed surface furnish may be imparted if desired. Such a surface is totally free of openings and presents a desirable "custom" appearance.

Referring now to another aspect of the invention, it is also possible, working with existing shield mounting systems, to discard an existing front clamping or cover element of an unsightly type from an existing motorcycle windshield and replace the clamp with the contoured leading front surface style clamping elements having the fastener-free and other features of construction and arrangement just described. In this way, an improved appearance and greater strength security and freedom from distortion and vibration may be achieved in relation to windshield construction wherein the front clamping element lacks the structural and decorative characteristics of the field of the present invention.

Referring now to the installation of the apparatus, when an entire windshield mounting assembly is used, it is assembled as illustrated in the drawings. If portions of the front clamping elements are replaced, the existing front clamping elements are removed and the shield is disassembled. Thereafter, the fasteners are placed within the slots and positioned approximately in a position of registration with the appropriate openings in the rear clamping element and in the shield.

Preferably, where gasketing material is provided, it is adhesively secured to the shield-facing surfaces of the clamping elements. Thereafter, the openings and fasteners are aligned and the front clamping elements are pushed rearwardly. In this connection, it will be appreciated that using the form of fasteners illustrated with the L- or T-shaped heads, the fasteners are secured against rotational or other movement except that of side-to-side motion and positioning and inserting the front clamping elements is simple and straightforward. When this is done, the appropriate nuts or other locking devices are installed and the installation is complete. The tongue 98 is preliminarily registered with the slot when assembling the vertical clamping elements relative to the transverse element.

The completed installation has proven very satisfactory in use and in addition to improved security and stability, provides a highly attractive trim without requiring additional pieces or elements.

It will thus be seen that the present invention provides a new and improved windshield mounting apparatus and components thereof, having a number of advantages and characteristics including those expressly pointed out herein, and others which are inherent in the invention. An illustrative embodiment of the product of the invention having been shown and described, it is anticipated that variations to the described form of apparatus will occur to those skilled in the art and that such modifications and changes may be made without departing from the spirit of the invention, or the scope of the appended claims.

I claim:

1. A motorcycle windshield and mounting assembly comprising a combination clamping and mounting assembly and a transparent windshield secured between elements of said clamping assembly and positioned by said mounting assembly relative to an associated motorcycle, said windshield having front and rear surfaces, and a plurality of fastener-receiving openings extending therethrough, said windshield including an upper, principal portion adapted to be seen through by a rider and a lower portion secured between said elements of said clamping assembly, said combination clamping and mounting assembly including a pair of horizontally spaced apart, generally vertically extending mounting brackets each having a rear clamping portion engaging said windshield rear surface and a portion adapted to be secured to a part of an associated motorcycle, a transverse rear clamping element extending generally horizontally between portions of said mounting brackets, said transverse clamping element also having portions engaging said windshield rear surface, a plurality of spaced apart fastener-receiving openings in said transverse clamping elements and in each of said mounting brackets, and a plurality of front clamping elements, one of said front clamping elements being a transverse element and others of said clamping elements extending vertically, with all of said front clamping elements being aligned respectively with counterpart portions of said rear clamping element and said mounting brackets, and a plurality of fasteners being registered with and extending through said openings in said windshield, and into said openings in said rear clamping elements to secure said windshield in snug relation to said mounting brackets, said transverse front clamping element including at least a pair of vertical slots on its rear surface, each of said vertical front clamping elements including an upper end portion having a tongue engageable with one of said slots and an arcuate relief portion contoured so as to snugly engage said leading surface of said front transverse clamping element so as to permit a portion of the upper end of each of said vertical clamping elements to overlie a lower margin of said transverse front clamping element.

2. A motorcycle windshield and mounting assembly as defined in claim 1, wherein each of said front clamping elements has a finished and contoured leading edge portion.

3. A motorcycle windshield and mounting assembly as defined in claim 1, wherein said front clamping elements each includes a rearwardly open, elongated T-slot with said fasteners being plural captive fasteners positioned within said T-slot for free but limited movement.

4. A motorcycle windshield and mounting assembly as defined in claim 3, wherein each of said front clamping elements has a finished and contoured leading edge portion.

* * * * *